United States Patent [19]

Iwagami

[11] Patent Number: 4,947,187

[45] Date of Patent: Aug. 7, 1990

[54] INK JET PRINTER NOZZLE CLOGGING-PREVENTIVE DEVICE

[75] Inventor: Fusao Iwagami, Nara, Japan

[73] Assignee: Sharp Corporation, Osaka, Japan

[21] Appl. No.: 298,840

[22] Filed: Jan. 18, 1989

Related U.S. Application Data

[63] Continuation of Ser. No. 166,712, Mar. 11, 1988, abandoned.

[30] Foreign Application Priority Data

Mar. 11, 1987 [JP] Japan ........................ 62-56124

[51] Int. Cl.[5] .................... G01D 15/16; B41J 3/04

[52] U.S. Cl. .................... 346/1.1; 346/140 R

[58] Field of Search .................... 346/140, 1.1

[56] References Cited

U.S. PATENT DOCUMENTS 4,296,418 10/1981 Yamazaki .................... 346/140 X
4,540,997 9/1985 Biggs .................... 346/140
4,734,718 3/1988 Iwagami .................... 346/140

FOREIGN PATENT DOCUMENTS 127767 7/1984 Japan .

*Primary Examiner*—Joseph W. Hartary
*Attorney, Agent, or Firm*—Robert F. O'Connell

[57] ABSTRACT

The ink jet printer nozzle clogging-preventive device of the present invention is characterized in that the device prevents air from entering the nozzle part and prevents the ink in said nozzle from drying and solidifying when an ink jet printer is transported, when the printer power is turned off, or when the printer is stopped to perform no printing for a long time while the power remains turned on.

That is, the device is characterized in that only one cap adhering device is provided as a means to cover the nozzle surface of a printer and said cap adhering device is allowed to perform an appropriate nozzle clogging-preventive action according to said printer conditions (such as non-printing condition with said printer power on, power-off condition, said printer transportation or long-period storage condition, and nozzle recovery operation condition).

7 Claims, 6 Drawing Sheets

INK JET PRINTER NOZZLE CLOGGING-PREVENTIVE DEVICE

This is a continuation of co-pending application Ser. No. 166,712 filed on Mar. 11, 1988 (now abandoned).

BACKGROUND OF THE INVENTION

The present invention relates to a nozzle clogging-preventive device which prevents air from entering the nozzle part and prevents the ink in said nozzle part from drying/solidifying when an ink jet printer is transported, when the power to the printer is turned off, or when the printer is stopped to perform no printing for a ling time while said power remains turned on.

In an ink jet printer, when no printing is performed, the nozzle of an ink jet part is left in the atmosphere while the nozzle is filled with an ink, causing the ink to dry and solidify and leading to nozzle clogging. Also, when an ink jet printer is transported or stored, air enters the nozzle and the ink in the nozzle dries and solidifies to cause nozzle clogging as does for non-printing condition.

In order to cope with the problem encountered when no printing is performed, that is, when the power is turned off or when the printer is stopped for a long time while the power is turned on, a cap member (the first cap adhering device) has conventionally been provided which adheres to the nozzle surface to prevent ink drying. In addition to the cap adhering device mentioned above, in order to cope with the problem encountered when the printer is transported or stored for a long time, the second cap adhering device has also been provided which prevents air from entering the nozzle and prevents the ink from drying while said cap is filled with a maintenance liquid.

Accordingly, in a conventional printing equipment, said two different cap adhering devices as a nozzle clogging-preventive means have been required, making the equipment componentally complex.

The second cap adhering device used for said transportation and long-period storage has required a complex operation to have the cap filled with the maintenance liquid. Also, the handling of said device has been very troublesome.

On the other hand, when air had entered to nozzle due to some cause to develop nozzle clogging, a nozzle recovery operation has been performed such that, while said cap has been allowed to adhere to the nozzle surface utilizing said second cap adhering device, a sucking means such as an injector has been connected to said cap to lead the internal pressure of the cap and nozzle part to a negative value by said sucking means, allowing the bubbles entering the nozzle to be extracted from the nozzle.

Thus, conventional ink jet printers have had such problems as the complex composition of the first and second cap adhering devices mentioned above, the troublesome operation of the maintenance liquid filling relating to said second cap adhering device, and the complex nozzle recovery operation when bubbles enter the nozzle, in order to prevent nozzle clogging.

In a system in which a single cap member is used, e.g., that of Iwagami et al., U.S. Pat. No., 4,734,768, issued on Mar. 29, 1988, the mechanisms for causing the cap to cover the nozzle, for controlling ink flow to the nozzle, and for controlling the maintenance liquid flow to the cap, are controlled so that ink is prevented from flowing to the nozzle when power is on but printing is not being performed and so that maintenance liquid flow is provided when printing power is off for a long time period. However, no provision is provided to control ink flow when printing power is shut off for only a relatively short time period.

SUMMARY OF THE INVENTION

The present invention is proposed to solve the problems which are incidental to the clogging-preventive devices of the conventional ink jet printers mentioned above.

In accordance with the present invention, a clogging-preventive device is characterized in that only one cap adhering device is provided as a means to cover the nozzle surface of a printer and said cap adhering device is allowed to perform an appropriate nozzle clogging-preventive action according to said printer conditions (such as non-printing condition with said printer power on, power-off condition, said printer transporting or long-period storage condition, and nozzle recovery operation condition).

The nozzle clogging-preventive device of the present invention comprises a moving mechanism including a cap member and a drive source to move said cap member toward a printing head, a first opening/closing means to open and close the ink passage connected from the printing head to an ink supply tank when the printing head is covered with the cap member, a switching means to switch the inside of the cap member to closed condition or to atmospherically open condition when the printing head is covered with the cap member, a pump means connected to the inside of said cap member to lead the internal pressure of said cap to a negative value, a maintenance liquid supply means to supply a maintenance liquid into said cap member, a second opening/closing means to open and close said maintenance liquid supply means, a control means to control said moving mechanism, said pump means, said maintenance liquid supply means and said first and second opening/-closing means according to said printer conditions, and a directing means to direct said nozzle recovery operation if air enters the nozzle of the printing head.

The nozzle clogging-preventive device of the present invention is characterized in that said control means allows the first motion by which the moving mechanism is drived according to the non-printing condition with the printer power on and to the normal power-off condition to cause the printing head to be covered with said cap member, allows the second motion by which the moving mechanism is driven according to the printer power-off conditions such as the printer transportion and long-period printer stoppage conditions to cause the printing head to be covered with the cap member, and the maintenance liquid supply means is actuated to cause the cap member to be filled with the maintenance liquid, and allows the third motion by which following said second motion and according to the nozzle recovery direction the internal pressure of the cap member is reduced (to a negative value) by the pump means to cause the bubbles in the nozzle to be discharged.

In the device of the present invention, as a means to cover the printer nozzle surface, only one cap member allows an appropriate nozzle clogging-preventive motion to be automatically performed according to said printer conditions (such as non-printing condition with said printer power on, normal printer power-off condition, the power-off condition due to transportation or long-period storage, and the nozzle recovery operation condition) such that the device allows the temporary capping motion to cover simply the nozzle part with the cap member for the non-printing and normal power-off conditions, allows a motion to cover the nozzle part with the cap member and to supply the maintenance liquid into the cap member for the printer power-off condition due to transportation, and allows said motion for power-off condition and subsequent motion to reduce the internal pressure of the cap member by the pump means for bubble discharge from the nozzle for the nozzle recovery operation. The three modes mentioned above are automatically performed by the clogging-preventive device comprising only one cap member, and therefore, the maintenance liquid filling and nozzle recovery operation can be performed without troublesome hand work, eliminating erroneous handling and improving the reliability of the nozzle ink jet motion. Also, the maintenance liquid is injected into the cap for only the power-off condition due to transportation or long-period storage, and therefore, a lower running cost and no less clogging-preventive effect can be achieved than those for the injecting operation performed for all power-off conditions.

When the nozzle part has been covered with the cap member for non-printing condition, the internal pressure of the chamber **5*b* in the cap member 5 is made atmospheric by opening a solenoid valve 35, and the internal pressure of an ink passage 2*c* is made atmospheric by opening a gate valve 2*a*, which prevents air from entering the nozzle due to temperature change (particularly temperature drop, and because of difference in volume contraction between the ink and nozzle due to temperature change) and prevents ink from entering the nozzle due to the liquid movement in the ink passage 2*c* (opening the gate valve 2*a*** at the time of printing start causes liquid movement to occur).

In addition, the device requires no plural cap members and less member of parts to provide an advantageous composition.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
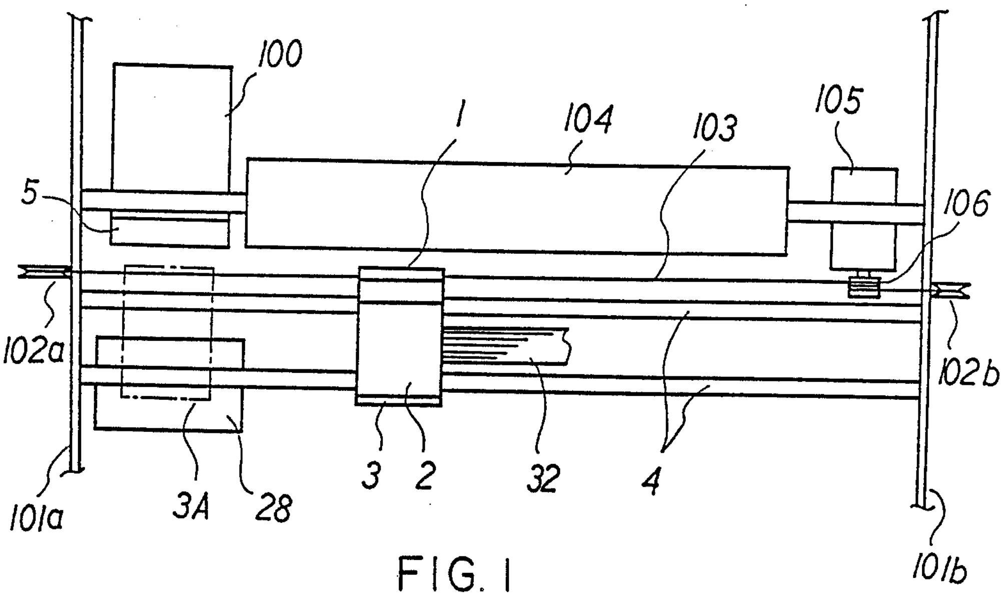
FIG. 1 is a plan view showing the printing part of an on-demand type ink jet printer according to the present invention.

In FIG. 1, a platen 104 is pivotally supported by frames **101*a* and 101*b*. A rotational mechanism (not shown) is connected to the platen 104** to control the rotation for paper feeding.

Two sliding shafts 4 and 4 are installed parallel to the platen 104 between said frames **101*a* and 101*b*, and a carriage 3 is slidably supported by the sliding shafts 4 and 4. A wire 103 stretched on the drum 106 connected to the rotating shaft of a motor 105 and on pullys 102*a* and 102*b* is installed on said carriage 3. With the rotation of said motor 105, the carriage 3 is reciprocatively moved over the recording region (travel part) at the right of a home position 3A when printing is performed, and is positioned at the home position 3A** when non-printing is performed (standby).

A printing head 1 including the orifices for ink jetting is disposed oppositely to the platen 104 at the front of said carriage 3, and plural orifices are defined in the orifice part of the printing head 1. An ink tank 2 to supply ink to the printing head is installed on the rear of the carriage 3.

The printing signals from the control (refer to FIG. 3) are sent through a cable 32 to said carriage 3 which is positioned at the home position 3A at the time of the standby of printing operation, printing power-off, and transportation with the printer packed.

Accordingly, a clogging-preventive device 100 which has a cap member 5 to cover the nozzle of the printer head 1 is located oppositely to the home position 3A of the carriage 3, and a tank 28 which accommodates the maintenance liquid supplied to said device 100 and receives the waste liquid from the printing head 1 and the device 100 is located below the home position 3A.

Figure 2:
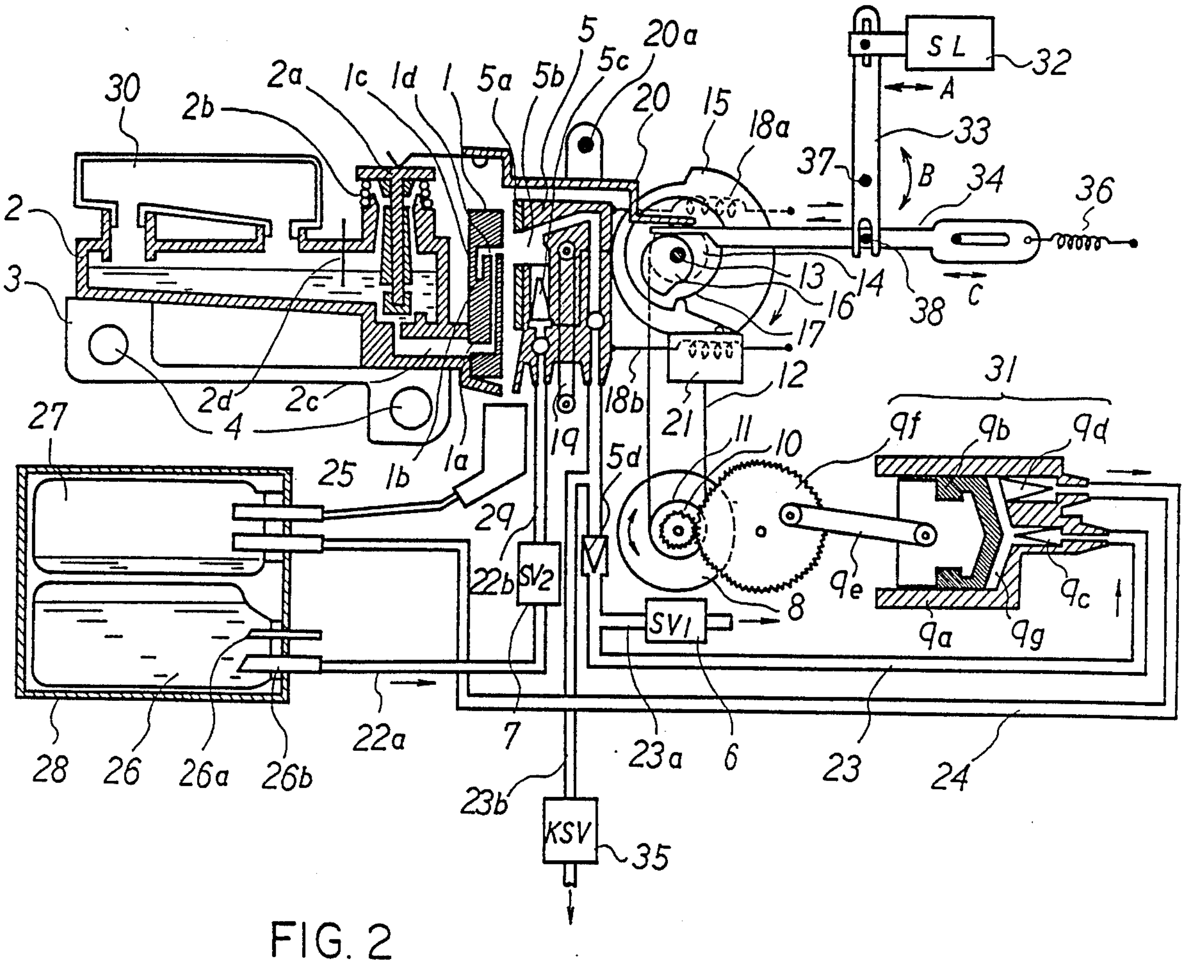
FIG. 2 is a composition drawing showing the clogging-preventive device installed on the printer.

Referring to FIG. 2, the composition of said printing head 1 and the clogging-preventive device 100 is described in a little more detail.

Located on said carriage 3 are a gate valve **2*a* which is placed in the ink passage 2*c* connecting the front-positioned printing head 1 to the rear-positioned ink tank 2 and which opens and closes said passage 2*c*, and ink cartridge 30 to add ink to the ink tank 2, and an electrode 2*d* to detect the presence of the ink in the ink tank 2. Said gate valve 2*a* is composed such that the valve 2*a* normally opens the ink passage 2*c* with the valve 2*a* actuated by a spring 2*b* and closes the ink passage 2*c* with the working shaft of the valve 2*a* depressed by an external force against the spring 2*b***.

A composition of said ink cartridge 30, the ink tank 2, the ink passage **2*c* and the gate valve 2*a* is independently provided so as to accommodate the number of nozzle blocks in the printing head 1**. In color jet printers, for example, said composition is provided so as to accommodate for each color of yellow, magenta and cyan.

The printing head 1 is composed such that the ink from the ink passage **2*c* is introduced into an ink chamber 1*b* by a nozzle capillary tube 1*a*, and is jetted from a nozzle orifice 1*d* by a piezoelectric element 1*c***.

On the other hand, the specific composition of the clogging-preventive device 100 is such that the cap member 5 to cover the nozzle part of the printing head 1 mentioned above has a chamber **5*b* with a front opening and is provided with a cushioning sealant 5*a*** such as rubber on the outer periphery of said opening.

The chamber **5*b* with a front opening in said cap member 5 composes a chamber provided separately for each nozzle block mentioned above. Check valves 5*c* and 5*d* are located in the inlet and outlet ports connected to said chamber 5*b*, that is, said check valve 5*c* is provided in the maintenance liquid inlet port to the chamber 5*b*, and the check valve 5*d* is provided in the outlet port connected to a suction pipe 23 to make the pressure of the chamber 5*b*** negative.

Said cap member 5 is pivotally supported by a supporting arm 19, the lower end of which is supported by the device frame. The cap member 5 is constantly actuated by a pair of springs 18a and 18b in such a direction as to be away from the printing head 1, and is moved through said supporting arm 19 as a moving shaft to such a position as to cover the nozzle of the printing head 1 by being depressed toward the printing head 1 with an external force against the springs 18a and 18b.

Said clogging-preventive device 100 also has a DC motor 8 and a solenoid 32 as a power source, and said motor 8 rotates in normal rotating direction or reverse rotating direction (clockwise or counterclockwise direction) by changing power application polarity.

A vacuum pump 31 relating to said motor 8 is provided and consists of parts 9a through 9g in which 9a is a cylinder, 9b is a piston, 9c and 9d are check valves, 9e is a piston rod, 9f is a gear and 9g is a pump chamber. 10 is a gear directly connected to the motor 8 to transmit the torque of the motor 8 to the gear 9f of the vacuum pump 31.

Flexible synthetic regin pipes 23 and 24 are connected to the inlet and outlet, respectively, of said vacuum pump 31, and the other end of the pipe 23 connected to the inlet (suction port) of the pump 31 is connected to the outlet port of the chamber 5b in said cap member 5. The other end of the pipe 24 connected to the outlet (discharge port) of said pump 31 is connected to a waste liquid tank 27 of the tank 28.

On the other hand, a moving mechanism relating to said motor 8 is provided to move the cap member 5.

That is, 11 is a pully directly connected to the motor 8, and is designed to transmit the torque of the motor 8 through a belt 12 and a one-way clutch with pulley 14 to a cam shaft 13. Said one-way clutch with pulley 14 performs such a action as to transmit the torque in normal/reverse direction of the motor 8 to the cam shaft 13 in only one direction (in this embodiment, to rotate the cam shaft only rightward as you face the sectional view).

15, 16 and 17 are eccentric cams directly connected to the cam shaft 13, in which 15 is a cam to move adherently the cap member 5 to the printing head 1, 16 is a cam to open and close the gate valve 2a through a valve lever 20, and 17 is a cam to turn on and off a microswitch 21.

32 is a solenoid valve which moves in the arrow direction A, and 33 is a connecting link which moves around a supporting point 37 in the arrow direction B according to the movement of the solenoid 32. 34 is a select plate which is interlocked with the connecting link 37 through a supporting point 38 and moves in the arrow direction C, and 36 is a spring which gives a drag to the select plate 34.

Said valve lever 20 is pivotally supported through a supporting part 20a by the device frame at the center of the lever, and one end of the lever is positioned so as to have a gap just equal to the cam lift above the outer periphery of said cam 16 and the other end of the lever is positioned on the working shaft of the gate valve 2a mentioned above. Accordingly, when the solenoid valve 32 is energized to move the select plate 34 leftward through the connecting link 33 causing the cam to be rotated, the thick part of the select plate 34 is inserted between the lever 20 and the cam 16 to cause the lever 20 to be rotated counterclockwise around the supporting part 20a and to cause the other end of said lever to depress the working shaft of the gate valve 2a against the spring 2b, with the result that the ink passage 2c is shut by the gate valve 2a. That is, even if the cam is allowed to be rotated without moving the select plate 34 leftward, the ink passage 2c cannot be shut by the gate valve 2a.

Said microswitch 21 is designed to detect the rotation angle of the cam shaft 13.

The tank 28 mentioned above is provided in the tank case with a maintenance liquid tank 26 accommodating a maintenance liquid consisting of water or another solvent and with a waste liquid tank 27.

A flexible pipe 22a is connected to said maintenance liquid tank 26, and the other end of the pipe 22a is connected to a solenoid valve 7 from which a pipe 22b is connected to the inlet port of the chamber 5b in the cap member 5. That is, when said solenoid valve 7 is opened, the maintenance liquid of the tank 26 is introduced through the pipes 22a and 22b into the chamber 5b in the cap member 5.

The waste liquid discharged from the printing head 1 and the cap member 5 is introduced through a gutter 29 collecting the liquid and then through a flexible pipe 25 into said waste liquid tank 27. As mentioned above, the waste liquid discharged through the pipe 24 from the vacuum pump 31 is also introduced into the tank.

Said maintenance liquid tank 26 is provided with electrodes (sensors) 26a and 26b to detect the presence of the liquid in said tank 26, in which the electrode 26b consists of a metal pipe, serving as a connecting pipe with the pipe 22a.

The pipe 23 connecting the cap member 5 to the vacuum pump 31 is provided in midway positions with branch passages 23a and 23b, in which said branch passage 23a is led through a solenoid valve 6 to atmosphere and the branch passage 23b also is led through a state-holding type solenoid valve 35 to atmosphere. The state-holding type solenoid valve 35 can open or close depending on the current direction flowed through the solenoid valve coil, and can hold the opening or closed state if the power is turned off until a reverse current is allowed to be flowed through the coil.

The control components of the ink jet printers provided with the clogging-preventive device 100 mentioned above is composed as shown in FIG. 3.

Figure 3:
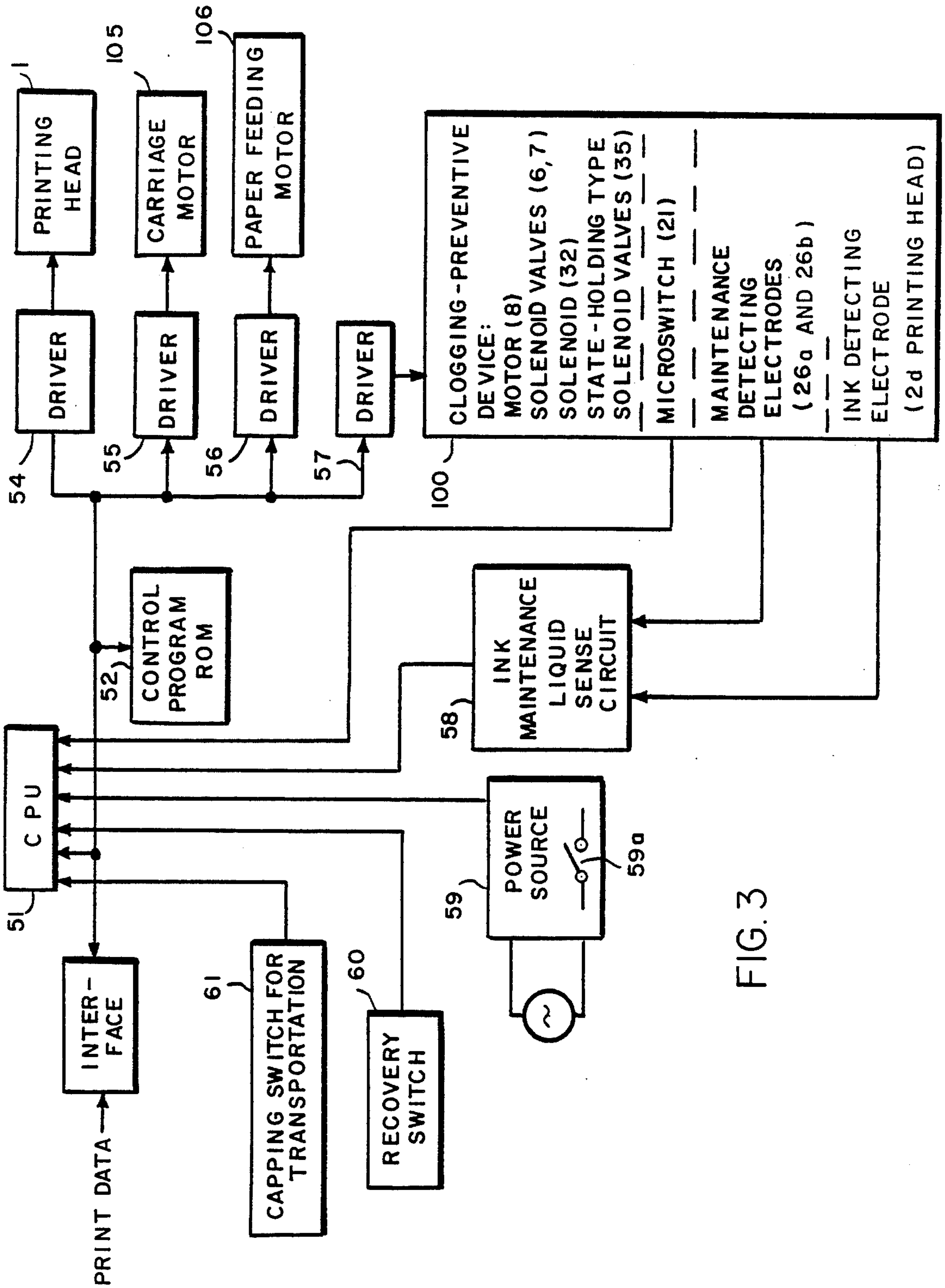
FIG. 3 is a block diagram showing the control composition of the printer having said clogging-preventive device, and FIGS. 4(*a*) through (*d*) are flowcharts showing the motion of said clogging-preventive device.
Figure 4A:
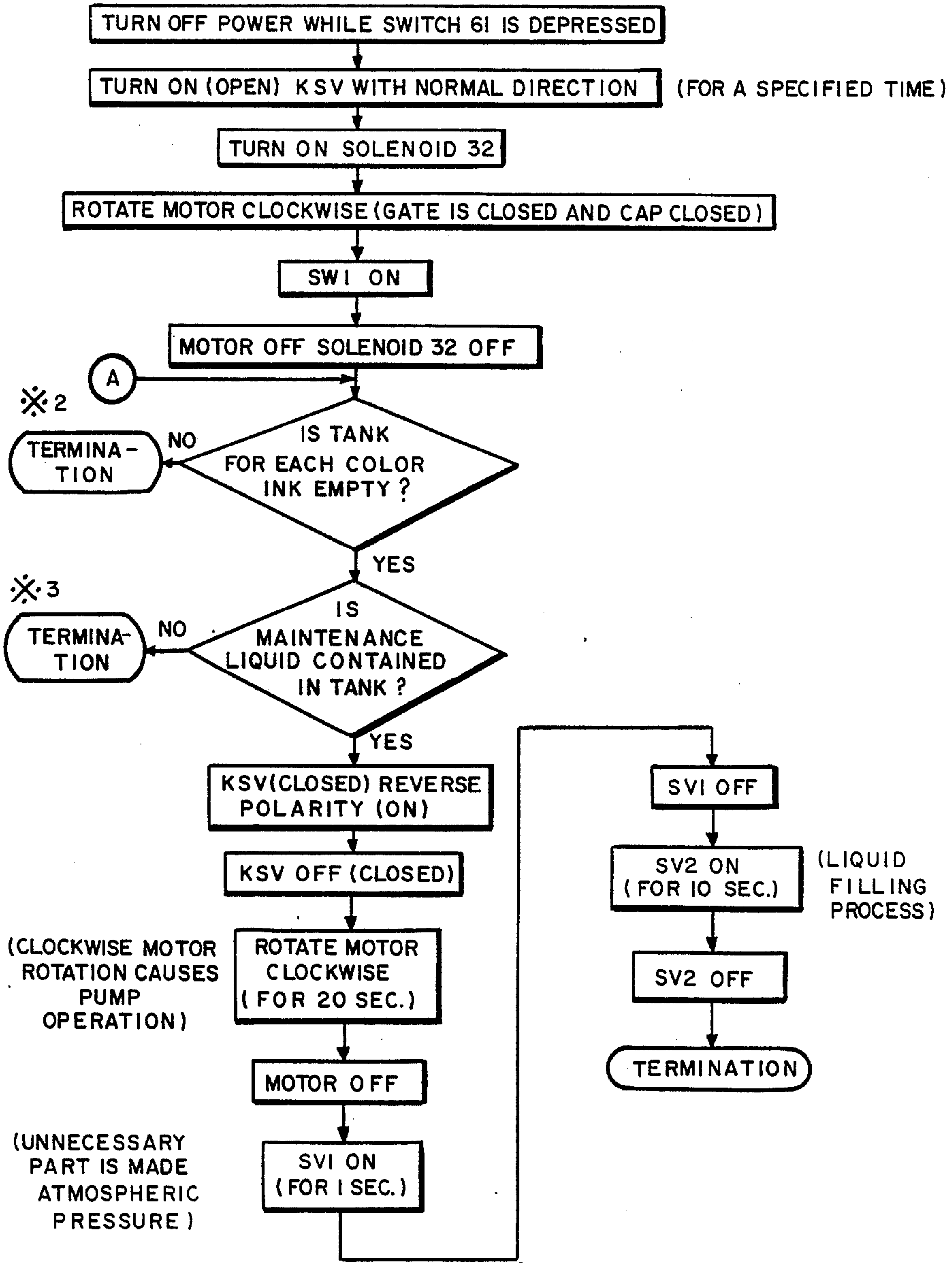
Figure 4B:
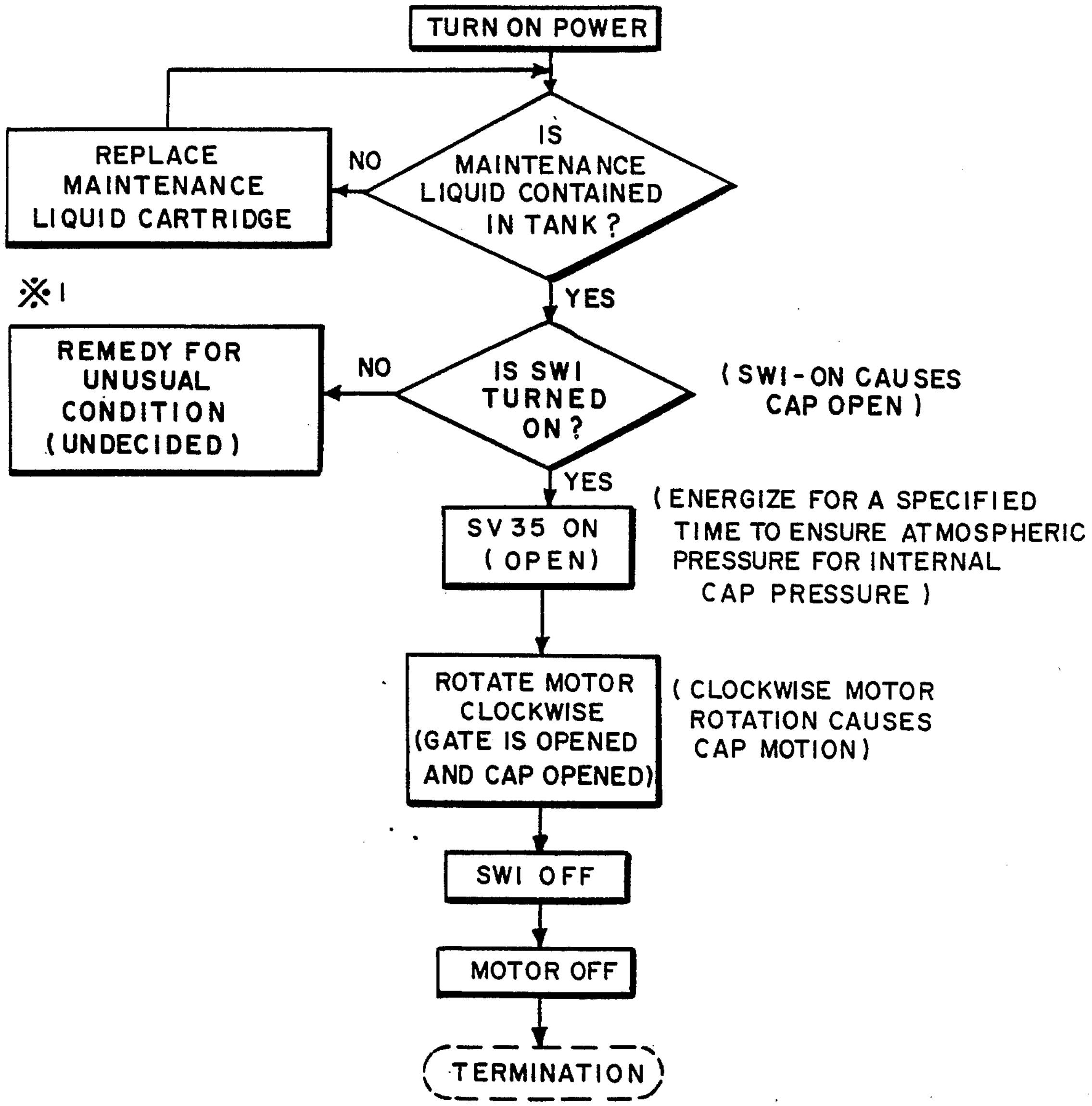
Figure 4C:
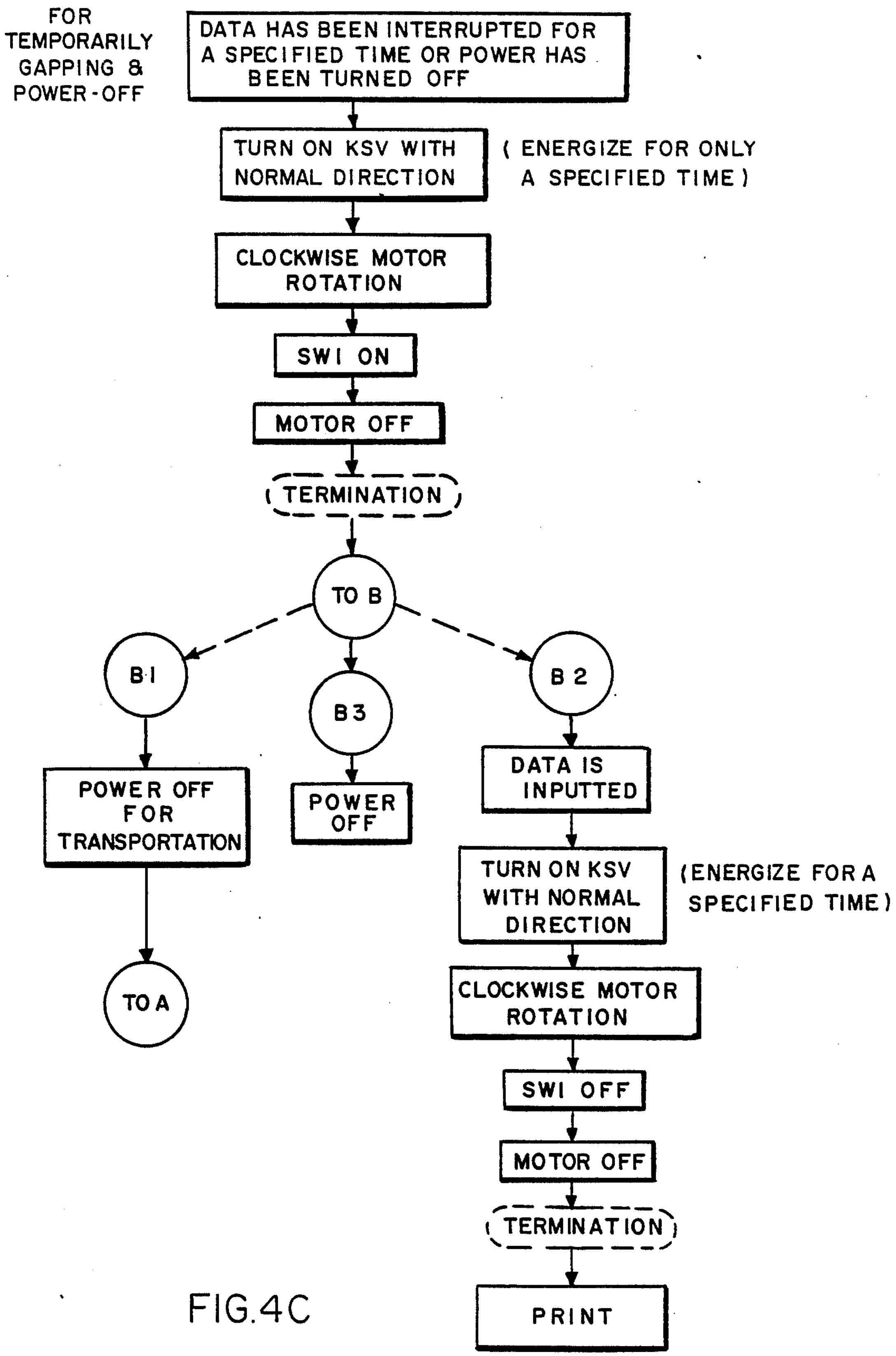
Figure 4D:
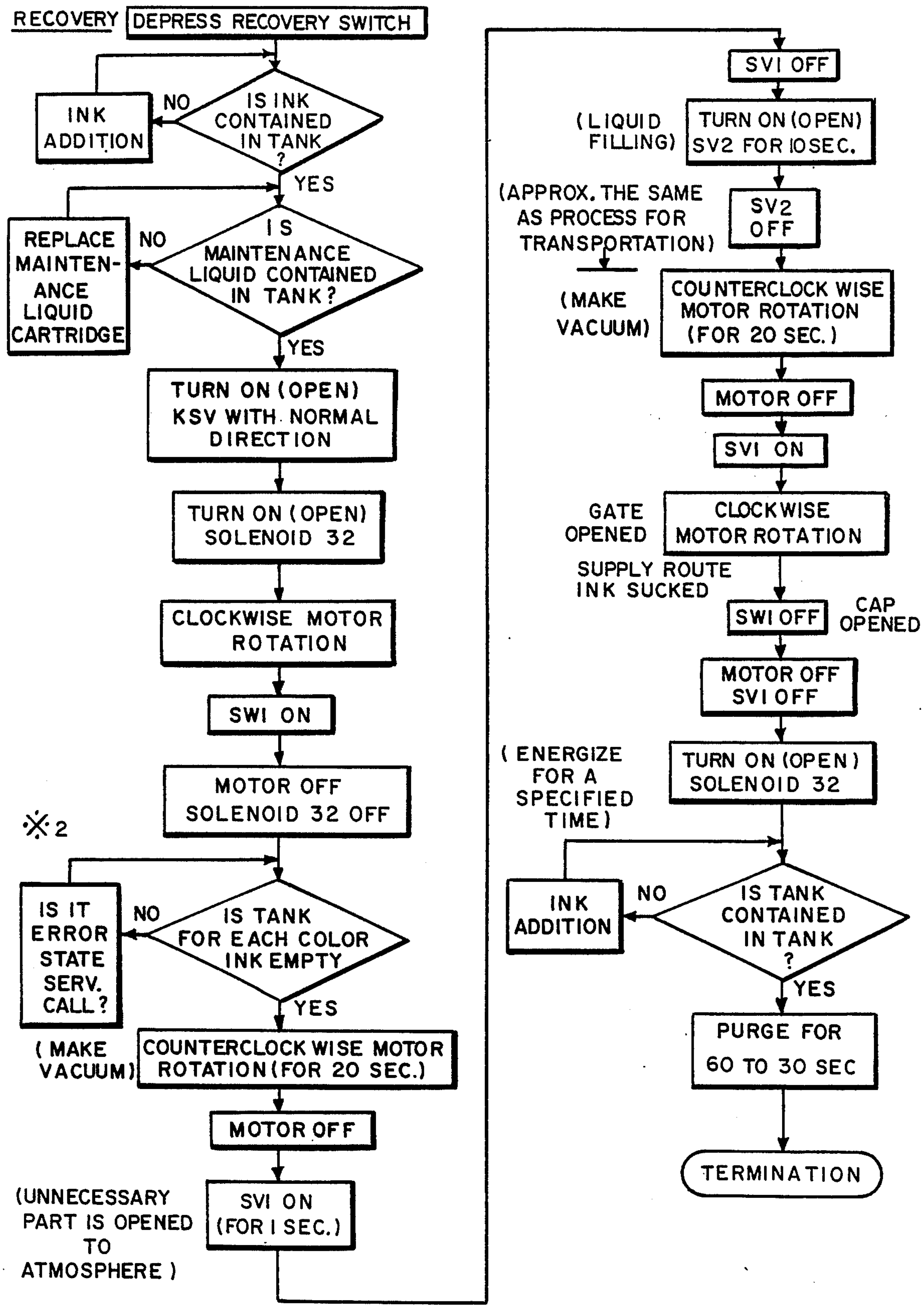

In FIG. 3, 51 is a main CPU, 52 is a ROM storting a control program, 53 is an interface receiving a print data, and said CPU 51 controls the print data according to the control program in the ROM 52.

54 is a driver for the printing head 1, 55 is a driver for a carriage drive motor 105, 56 is a driver for a paper feeding motor 106 to drive the platen 104, and 57 is a driver for the clogging-preventive device 100 mentioned above.

Said driver 57 drives and controls the motor 8 for the clogging-preventive device 100, the solenoid valves 6 and 7, the solenoid 32, the state-holding type solenoid valve 35, the microswitch 21, the electrodes (sensors) 26a and 26b in the tank 26, and the ink detecting electrode 2d in the ink tank 2.

58 is a sense circuit for the ink and maintenance liquid to input the signals from said electrodes 26a and 26b and the signals from the ink detecting electrode 2d, and the output from the sense circuit 58 is led to the CPU 51. 59 is a power circuit of the device and is provided with a power switch 59a of the device.

60 is a switch to direct and input the nozzle recovery function and the direction by the switch 60 is introduced to the CPU 51.

61 is a switch to direct and input the capping sequence for transportation, and the direction by the capping switch 61 is introduced to the CPU 51.

The motion of the ink jet printers composed as mentioned above according to the present invention is described hereinafter. The flow of the motion is shown in FIG. 4.

(1) Motion for transportation (refer to FIG. 4 (*a*))

In a condition where the printer power is turned on, when the power switch 59*a* is turned off while the capping switch 61 is depressed, during printing, the motor 105 is rotated by the CPU 51 to cause the carriage 3 to be returned to the home position 3A. For printing standby condition, the carriage 3 remains positioned at the home position 3A.

In that case, the printer body power 59 is designed to continue the power supply to each printer section until the power-off process of the device is completed.

When the capping signals based on the input of the capping switch 61 are inputted into the CPU 51, the device functions as shown hereinafter by the control of the CPU together with the control program ROM 52. At that time, the mechanism of the device is shown in FIG. 2.

When the solenoid valve 35 is first energized with normal direction current, the valve is opened (SV 1 ON) to cause the internal pressure of the pipe 23 and the pump chamber 9*b* to become atmospheric. When the solenoid valve 32 is then energized, the select plate 34 is moved leftward. When the motor 8 is then directed through energization to be rolated clockwise, as previously described, the cam shaft 13 is rotated clockwise by the one-way clutch 14. At that point, with respect to the eccentric cam 16 the rotation causes the gate valve 2*a* of the ink tank 2 to be closed through the valve lever 20, with the result that the ink tank 2 and the ink passage 2*c* are shut, and with respect to the eccentric cam 15 the rotation causes the cap member to be moved toward and adhere to the printing head 1.

At that point the microswitch 21 to detect rotation angle is changed from off to on by the eccentric cam 17, causing the motor 8 and the solenoid valve 35 to be turned off, and the gate valve 2*a* and the cap member 5 remain in that condition, where the cap member 5 adheres to the printing head 1 and the internal pressure of the chamber 5*b* in the cap member becomes atmospheric.

In order to prevent air from entering the nozzle due to the air pressure, a sequence is provided such that the gate valve 2*a* is closed and then the cap member 5 adheres to the printing head 1. At this time, negative direction (reverse polarity) current is allowed to flow through the solenoid valve 35 to cause the valve to be closed, and the current is turned off.

Thereafter, when the motor 8 is directed through energization to be rotated leftward, the eccentric cams 15, 16 and 17 remain in that position because the cam shaft 13 does not rotate due to the one-way clutch action, and only the vacuum pump 31 is operated by the rotation of the gear 10. Because the motor is energized for specified time, the internal pressure of the chamber 5*b* in the cap member 5 and of the pipes 22*b* and 23 approach a vacuum condition and reach a specified value by the pump operation. At this point, by turning off the motor 8 and energizing the solenoid valve 6 for a short time, the internal pressure of the pipe 23 and the pump chamber 9*g* becomes atmospheric. This operation aims to prevent the unnecessary part of the pipe 23 and the pump chamber 9*g* from being filled with the maintenance liquid and to save the liquid in the following maintenance liquid filling process.

Then, by energizing the solenoid valve 7 for a specified time, the valve is opened and the maintenance liquid is sucked through the pipes 22*a* and 22*b* into the chamber 5*b* in the cap member 5 because of the internal near-vacuum pressure of the pipe 22*b* and the member 5*b* in the cap member to cause the nozzle orifice to be filled with the maintenance liquid, with the result that ink drying and solidifying, air entering into nozzle, and nozzle orifice contamination are prevented.

(2) Motion for power-on (refer to FIG. 4 (*b*))

When the power switch 59*a* is turned on, the power is supplied from the power source 59 to each part, and the power-on signals are inputted into the CPU 51, causing the device to be operated by the printer control as shown hereinafter.

When the solenoid valve 35 is first energized with normal direction current, the valve is positively opened to cause the internal pressure of the pipe 23 and the pump chamber 9*g* to become atmospheric. Under this condition, when the motor 8 is energized to be rotated clockwise, the cam shaft 13 is rotated clockwise and the closed gate valve 2*a* is opened by the eccentric cams 15 and 16 to cause the cap member 5 to be placed at from the adhering position to the opened position. At this point, the microswitch 21 is changed from on to off to cause the motor 8 and the solenoid valve 6 to be turned off, resulting in the termination of this process. At this time, the maintenance liquid discharged from the chamber 5*b* in the cap member 5 is collected by the gutter 29 to be recovered through the pipe 25 by the waste liquid tank 27.

Under that condition, the printer head 1 is in standby condition, making it possible to perform printing.

(3) Temporaly capping motion for non-printing and normal power-off (refer to FIG. 4(*c*))

Even if print data is interrupted for a specified time and the power is turned off under printer power-on condition, a motion is performed such that the printing head 1 is covered with the cap member 5 to prevent the nozzle ink from drying and solidifying.

The CPU 51 detects the fact that print data is interrupted for a specified time or the power is turned off as mentioned above, causing the printer control to move the device as shown hereinafter.

When the solenoid valve 35 is first energized with normal direction current, the valve is opened to cause the internal pressure of the pipe 23 and the pump chamber 9*g* to become atmospheric. When the motor 8 is then directed through energization to be rotated clockwise, the cam shaft 13 is rotated clockwise and the eccentric cam 16 is rotated as mentioned above, but the gate valve 2*a* of the ink tank does not shut through the valve actuator lever 20 the ink tank 2 and the ink passage 2*c* because the solenoid 32 is not actuated. However, the rotation of the eccentric cam 15 causes the cap member 5 to be moved and adhere to printing head 1. At this point, the microswitch 21 is changed from off to on by the eccentric cam 17 to cause the motor 8 and the solenoid valve 6 to be turned off, with the result that the gate valve 2*a* and the cap member 5 remain in that condition.

At that time, the maintenance liquid sucked in the process for recovery or transportation is contained in the concavity at the perimeter of the check valves 5*c* and 5*d* in the cap member 5, and the chamber 5*b* in the cap member 5 is filled with the vapor of the maintenance liquid, with the result that the vapor prevents effectively the nozzle orifice part of the printing head 1 from being clogged.

When print data is then inputted into the printer under that condition, the device is operated to restore the condition of the printing head 1 to the printing operable condition as shown hereinafter.

When the solenoid valve 35 is energized with normal direction current, the valve is positively opened to cause the internal pressure of the pipe 23, the pump chamber **9*b* and the chamber 5*b* in the cap member 5 to become atmospheric. Then, when the motor 8 is energized to be rotated clockwise, the eccentric cams 15, 16 and 17 are rotated to a specified angle as mentioned above, causing the cap member 5 to be separated from the printing head 1 and then causing the motor 8 and the solenoid valve 6 to be turned off. Thus, the condition of the printing head 1** becomes printing operable.

Also, under said temporaly capping motion condition for non-printing, when the power switch **59*a* of the printer and the capping switch 61 are turned off, the later half process for power-off mentioned above is performed thereafter. That is, after the vacuum pump 31 is drived and the internal pressure of the chamber 5*b* in the cap member 5 and of the pipes 22*b* and 23** is made vacuum, the filling of the maintenance liquid is allowed to be performed.

(4) Nozzle recovery motion (refer to FIG. 4(*d*))

If air enters the nozzle in the printing head due to some cause to develop clogging, the following treating process is performed to remove the bubbles in the nozzle.

That is, when the recovery switch 60 shown in FIG. 3 is turned on, the device is operated by the control as shown hereinafter.

The description of the former half process of this motion is omitted because the process is the same as the whole process for transportation, and it is assumed that the cap member 5 adheres to the printing head 1 and the chamber **5*b* in the cap member and nozzle orifice part 1*a*** are filled with the maintenance liquid.

Also, the gate valve **2*a* has been closed to shut the ink flow from the ink tank 2 to the printing head 1. Under this condition, when the motor 8 is energized for a specified time to be rotated leftward, the motor rotation is not transmitted to the cam shaft 13 but to the pump 31 to be operated to cause the internal condition of the chamber 5*b* in the cap member 5 to approach a vacuum condition, with the result that the bubbles in the nozzle are discharged. That is, the maintenance liquid and the like are discharged through the pipe 23, the pump 31 and the pipe 24 into the waste liquid tank 27. Then, when the solenoid valve 6 is turned on after the motor 8 has been turned off, the valve is opened to cause the internal pressure of the pipe 23 and the pump chamber 9*g*** to become atmospheric.

At that time, the internal pressure of the chamber **5*b* in the cap member 5 remains negative, and now the gate valve 2*a* is opened by torating the motor 8 clockwise to return the select plate 34 and the solenoid 32 by the spring 36 to their original positions before the solenoid 32 is drived. Thereafter, when the cap member 5 is separated from the printing head 1, the inks 1*a* and 2*c* with an increased viscosity and the bubbles in the nozzle are discharged and recovered through the gutter 29 by the waste liquid tank 29. Also, the cam shaft 13 is rotated to a specified angle to cause the microswitch 21 to develop signals by which the motor 8 and the solenoid valve 6 are turned off, resulting in the termination of the motion. Thus, the condition of the printing head 1** becomes printing operable.

While only certain embodiments of the present invention have been described, it will be apparent to those skilled in the art that various changes and modifications may be made therein without departing from the spirit and scope of the present invention as claimed.

What is claimed is:

1. An ink jet printer clogging-preventive device for positioning a carriage at a non-travel position when printing is not being performed by said printer and for covering a printing head installed on the carriage with a cap member at the non-travel position, said device comprising:

- a moving mechanism including a cap member placed oppositely to the printing head of the carriage at said non-travel position and movable in a direction away from or near to said printing head and a drive source to move said cap member toward the printing head;
- a first opening/closing means to open and close an ink passage connected from said printing head to an ink supply tank when the printing head is covered with said cap member;
- a switching means to switch the inside of the cap member to a closed condition or to an atmospherically open condition when the printing head is covered with said cap member;
- a pump means connected to the inside of said cap member for providing a negative internal pressure in said cap member when the printing head is covered with said cap member;
- a maintenance liquid supply means to supply a maintenance liquid into said cap member;
- a second opening/closing means to open and close said maintenance liquid supply means;
- a control means to control said moving mechanism, said first opening/closing means, said switching means, said pump means, said maintenance liquid supply means, and said second opening/closing means; and
- a directing means to direct a recovery operation of a nozzle in the printing head if air enters said nozzle;

wherein said control means allows (1) a first motion by which the cap member is moved toward the printing head for a non-printing condition with the printer power on and for a normal short-term printer power-off condition so as to cause the printing head to be covered with said cap member;

(2) a second motion by which the cap member is moved toward the printing-head for a long-term power-off condition, such as for printer transportation or for long-period printer stoppage or storage so as to cause the printing head to be covered with the cap member, and so as to cause the maintenance liquid supply means to be actuated to cause the cap member to be filled with the maintenance liquid; and (3) a third motion by which, following said second motion and for a nozzle recovery condition, a negative internal pressure of the cap member is provided by the pump means so as to cause bubbles in the nozzle to be discharged.

2. A device for use in an ink jet printer having a printing head with a nozzle, a supply of ink for flowing into said nozzle, said device preventing clogging of the nozzle and comprising a cap member for covering said nozzle;

first means connected to said cap member for causing said cap member to cover said nozzle;

second means connected to said ink supply for controlling a flow of ink into said nozzle;

a supply of maintenance liquid;

third means connected to said maintenance liquid supply for controlling the flow of maintenance liquid into said cap member; and control means connected to said first, second, and third means for controlling the operations thereof so that (1) said first means causes said cap member to cover the nozzle of said printing head and said second means prevents a flow of ink to said nozzle during a first non-printing mode when printing power is on, but printing is not being performed, or when printing power is off for a relatively short time period; and (2) said first means causes said cap member to cover said nozzle and said third means provides a flow of maintenance liquid into said cap member only during a second non-printing mode when printer power is off for a relatively long time period.

3. A device in accordance with claim 2 and further including fourth means connected to said cap member for providing a negative internal pressure in said cap member;

said control means further connected to said fourth means for controlling said fourth means so that a negative internal pressure is provided in said cap member to causes bubbles of air to be discharged from said nozzle during a third non-printing mode, following said second non-printing mode of operation, when nozzle recovery is required.

4. A method for preventing the clogging of a nozzle of a printing head in an ink jet printer when said printer is in one or more non-printing modes comprising the steps of covering the nozzle of said printer head and preventing a flow of ink into said nozzle during a first non-printing mode when printer power is on, but printing is not being performed, or when printing power is off for a relatively short time period; and covering the nozzle of said printer head and providing a flow of maintenance liquid to said nozzle during a second non-printing mode when printing power is off for a relatively long time period.

5. A method in accordance with claim 4 and further including discharging bubbles of air from said nozzle during a third non-printing mode, following said second non-printing mode, when nozzle recovery is required.

6. A method in accordance with claim 5 wherein during said first non-printing mode said nozzle is covered with a cap member and during said second non-printing mode said nozzle is covered with said cap member and said flow of maintenance liquid is provided to said cap member.

7. A method in accordance with claim 6 wherein said discharging step includes providing a negative internal pressure in said cap member to discharge said bubbles of air from said nozzle.

* * * * *